May 1, 1923.
W. F. LANGE
1,453,761
COMBINATION EGG BEATER AND CREAM REMOVER
Filed Oct. 9, 1922
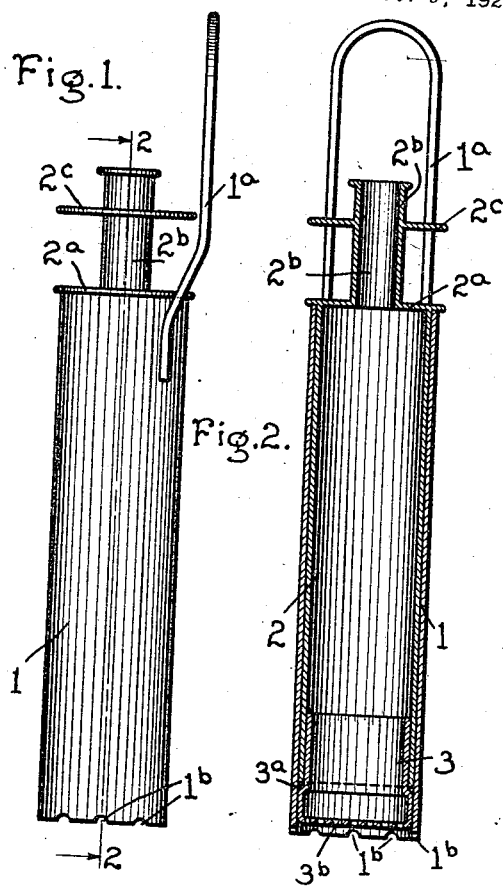
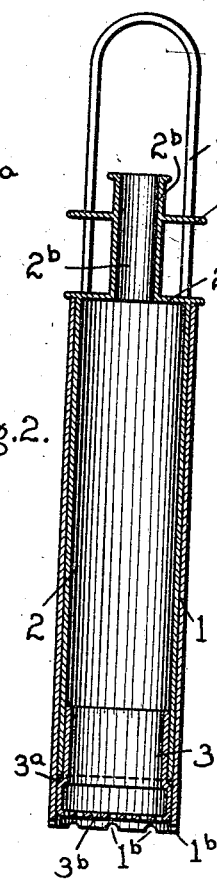
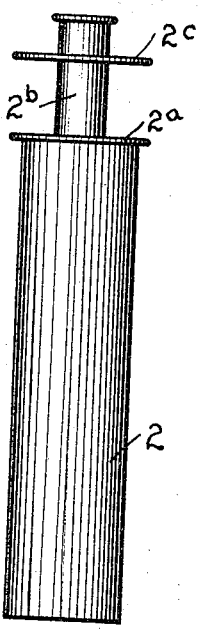
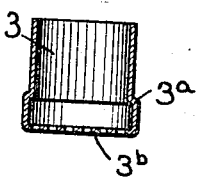
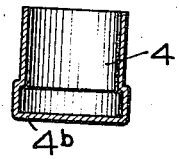
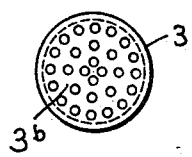
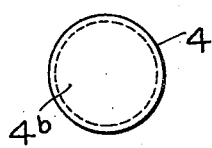
William F. Lange, Inventor
By Alexander F. Powell, Attorneys Patented May 1, 1923.

1,453,761

UNITED STATES PATENT OFFICE.

WILLIAM F. LANGE, OF ELGIN, ILLINOIS.

COMBINATION EGG BEATER AND CREAM REMOVER.

Application filed October 9, 1922. Serial No. 593,270.

*To all whom it may concern:*

Be it known that I, WILLIAM F. LANGE, a citizen of the United States, residing at Elgin, in the county of Kane and State of Illinois, have invented certain new and useful Improvements in Combination Egg Beaters and Cream Removers; and I hereby declare that the following is a full, clear, and exact description thereof, reference being had to the accompanying drawings, which form part of this specification.

This invention is a novel combined egg beater, cream whipper, and cream remover. The object of the invention is to provide a simple, efficient, and durable device adapted to beat eggs and whip cream, or may be adapted to remove cream from bottles and the like, and which may readily be taken apart after use for cleaning.

In the accompanying drawings I have illustrated one practical embodiment of the invention, and will explain the same with reference thereto to enable others to adopt and use the same, and will summarize in the claims the novel features of construction and novel combinations of parts, for which protection is desired.

In the drawings:

Fig. 1 is a side elevation of the device, assembled.

Fig. 2 is a vertical section thereof on the line 2—2 Fig. 1.

Fig. 3 is a side elevation of the plunger, removed.

Figs. 4 and 5 are detail sectional and end views of the perforated plug.

Figs. 6 and 7 are detail sectional and end views of the solid plug.

The device comprises tubular casing 1, a tubular plunger 2, and removable plugs 3 and 4.

The tubular casing 1, as shown, is preferably open at the top and bottom, and is provided at its lower end with a number of small notches $1^b$, as shown in Figs. 1 and 2, through which notches the egg or cream, during the whipping or beating operations, is alternately sucked and discharged, as hereinafter explained, for the purpose of disintegrating the same. A handle $1^a$ is attached to the upper end of casing 1, as shown in Figs. 1 and 2, said handle preferably comprising a U-shaped wire securely soldered or otherwise fastened to the outer side of said casing, adjacent the upper end thereof.

The tubular plunger 2 makes a sliding fit within the casing 1 and is slightly shorter than said casing. Plunger 2 is preferably open at the bottom, but partly closed at the top by a cap or head $2^a$ having a central opening surrounded by a tube $2^b$, smaller in diameter than the plunger 2, and extending upwardly from the head $2^a$, said tube $2^b$ being shorter than the plunger, and projecting above the top of the casing 1 when the plunger is fully inserted therein, as in Figs. 1 and 2. Attached to the tube $2^b$, at a convenient distance from the head $2^a$, is a finger piece $2^c$, which may be formed integral with the tube $2^b$, or attached thereto in any desired manner, said finger piece $2^c$ enabling the plunger 2 to be easily reciprocated in the casing 1, when the fingers of the operator are inserted between the head $2^a$ and said finger piece $2^c$. The tube $2^b$ extends slightly above the finger piece $2^c$, and is preferably open at the top and bottom. Air may thus be admitted into the top of the plunger 2 through the tube $2^b$ but the tube may be closed by the thumb or finger of the operator being placed over the upper end thereof.

The lower end of the plunger may be provided with a removable plug 3 which is adapted to be removably inserted within the bottom of plunger 2. As shown in Figs. 2, 4, and 5, the plug 3 is preferably cylindrical in form, and of a diameter to make a tight fit within the lower part of plunger 2, and is provided near its lower end with an external circumferential shoulder $3^a$ which is adapted to engage the lower edge of the plunger 2 when said plug 3 is inserted therein. The plug 3 is open at top but the lower end thereof is perforated as at $3^b$ said perforations being of any desired number and size.

A solid plug 4, shown in Figs. 6 and 7, may be used in place of plug 3, said plug being substantially identical in form with plug 3, but its lower end $4^b$ is imperforate.

The several parts 1, 2, 3, and 4 are preferably made of pressed metal; and all the parts are preferably nickel plated to facilitate cleaning thereof.

Operation.

To use the device as a beater, as shown in Figs. 1 and 2, plunger 2 is placed in the casing 1 and the lower end of casing 1 submerged in the egg or cream to be beaten or whipped, the lower end of the casing resting on the plate or bowl containing the egg or cream. The operator may then insert his fingers between the head 2ª and the finger piece 2ᶜ on the tube 2ᵇ and close the tube 2ᵇ with his thumb, and then reciprocate the plunger 2 within casing 1, said casing being held against the bottom of the container by means of the handle 1ª. As the plunger 2 is drawn up within the casing 1, the egg or cream is sucked into the lower portion of the casing through the notches 1ᵇ in the bottom thereof, and as the plunger 2 is depressed, the egg or cream is forced out through the notches 1ᵇ and up through the perforations 3ᵇ, the egg or cream being disintegrated as it passes through the notches 1ᵇ and perforations 3ᵇ.

If desired, the solid plug 4 may be placed in the lower end of the plunger in place of the perforated plug 3, then the tube 2ᵇ does not have to be closed by the thumb. By reciprocating the plunger 2 in the casing 1, the liquid will be alternately sucked and discharged through the notches 1ᵇ, and thereby disintegrated as above described.

When it is desired to remove cream from milk bottles and the like, the plunger 2 may be withdrawn from the casing 1 and used separately, with the perforated plug 3 inserted in the lower end thereof. By inserting the fingers between the head 2ª and the finger piece 2ᶜ the member 2 may be inserted slowly and carefully into the top of the milk bottle down through the cream to the milk line. Then, the upper end of the tube is closed by the thumb, and the plunger 2 lifted out of the milk bottle with the cream contained therein. Plunger 2 may then be inserted into any suitable container, and upon removing the thumb from the top of tube 2ᵇ, the cream will flow from the plunger into said container. This operation may be repeated until all the cream has been removed from the bottle.

What I claim is:

1. A device for the purpose specified, comprising a tubular casing open at top and bottom, and a tubular plunger slidably mounted in said casing and adapted to be reciprocated therein, and to be closed at the top by the thumb of the operator, substantially as described.

2. In a device as set forth in claim 1, a removable plug adapted to be inserted in the lower end of said plunger.

3. A device for the purpose specified comprising a tubular casing open at top and bottom and having notches in its lower edge, a plunger slidably mounted in said casing and open at top and bottom and adapted to be closed at the top by the thumb or finger of the operator, substantially as described.

4. In a device as set forth in claim 3, a removable plug adapted to be inserted in the lower end of said plunger.

5. A device for the purpose specified comprising a tubular casing open at top and bottom, a tubular plunger slidably mounted in said casing and adapted to be reciprocated therein, and open at the bottom, and a tube on the upper end of said plunger forming an operating handle for said plunger and adapted to be closed by the thumb or finger of the operator, substantially as described.

6. In a device as set forth in claim 5, a removable plug adapted to be inserted in the lower end of said plunger for the purpose specified.

7. In a device as set forth in claim 5, a finger piece on said tube forming an operating handle for said plunger and intermediate the ends thereof, substantially as described.

8. A device for the purpose specified comprising a casing open at the top and bottom and having notches in its lower edge and a handle attached to its upper end, a tubular plunger adapted to be reciprocated within said casing, a tube attached to the upper end of said plunger, said tube adapted to be closed by the thumb or finger of the operator, and a finger piece on said tube forming an operating handle for said plunger intermediate the ends thereof, substantially as described.

9. In a device as set forth in claim 8, a removable plug adapted to be inserted in the lower end of said plunger, for the purpose specified.

10. In a device for the purpose specified, a tubular member open at the bottom, a tube of smaller diameter attached to the upper end of said member and adapted to be closed at its upper end by the thumb or finger of the operator.

11. In a device as set forth in claim 10, a finger piece mounted on the tube intermediate the ends thereof, substantially as described.

12. In a device as set forth in claim 10, a removable plug adapted to be inserted in the lower end of said member, for the purpose specified.

In testimony that I claim the foregoing as my own, I affix my signature.

WILLIAM F. LANGE.